(12) United States Patent
Westhues et al.

(10) Patent No.: US 9,250,753 B2
(45) Date of Patent: Feb. 2, 2016

(54) CAPACITIVE TOUCH SURFACE IN CLOSE PROXIMITY TO DISPLAY

(71) Applicant: MICROSOFT TECHNOLOGY LICENSING, LLC, Redmond, WA (US)

(72) Inventors: Jonathan Westhues, Portland, OR (US); Sean Donnelly, Portland, OR (US); Jason Wilson, West Linn, OR (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 154 days.

(21) Appl. No.: 13/735,958

(22) Filed: Jan. 7, 2013

(65) Prior Publication Data
US 2014/0192007 A1 Jul. 10, 2014

(51) Int. Cl.
G06F 3/044 (2006.01)
G06F 3/047 (2006.01)

(52) U.S. Cl.
CPC .............. *G06F 3/044* (2013.01); *G06F 3/047* (2013.01); *G06F 2203/04107* (2013.01); *G06F 2203/04111* (2013.01); *G06F 2203/04112* (2013.01)

(58) Field of Classification Search
CPC ..... G06F 3/041; G06F 3/0412; G06F 3/0416; G06F 3/0418; G06F 3/044; G06F 3/047; G06F 3/048; G06F 3/0487–3/04886; G06F 2203/041; G06F 2203/04107; G06F 2203/04111–2203/04113
USPC .......... 178/18.01, 18.03, 18.06, 19.01, 19.03; 345/156, 173, 174, 87–104
See application file for complete search history.

(56) References Cited

U.S. PATENT DOCUMENTS

| 7,009,663 B2 | 3/2006 | Abileah et al. |
| 7,567,240 B2 | 7/2009 | Peterson, Jr. et al. |
| 2002/0104691 A1 | 8/2002 | Kent et al. |

(Continued)

FOREIGN PATENT DOCUMENTS

| JP | 2012053644 A | 3/2012 |
| JP | 2013120590 A | 6/2013 |
| WO | 2013039050 A1 | 3/2013 |

OTHER PUBLICATIONS

"3M TM Transparent Conductors Portfolio", SID 2011 Exhibitor's Forum, http://sec002.whspn.net/Portals/displayweek/Files/1.1.pdf, Available as early as Jan. 2011, 11 pages.

(Continued)

*Primary Examiner* — Nathan Danielsen
(74) *Attorney, Agent, or Firm* — Brandon Roper; Judy Yee; Micky Minhas (57) ABSTRACT

To address the above issues, a display device with a capacitive touch screen display having a touch surface in close proximity to a display stack is provided. The display may include a touch sheet with a top surface, a touch sensor having a matrix of capacitors formed of electrodes positioned below the touch sheet and configured to exhibit a change in capacitance of at least one of the capacitors in response to a touch on the top surface by a digit or stylus of a user, a display stack positioned below the matrix of capacitors and configured to emit light through a top surface of the display stack to travel in a light emitting direction through the matrix of capacitors and the touch sheet. A distance between the top surface of the touch sheet and the top surface of the display stack is between about 225 and 1500 micrometers.

17 Claims, 4 Drawing Sheets

(56) References Cited

U.S. PATENT DOCUMENTS

| | | | |
|---|---|---|---|
| 2004/0239650 A1 | 12/2004 | Mackey | |
| 2008/0024461 A1 | 1/2008 | Richter et al. | |
| 2009/0262092 A1* | 10/2009 | Halsey et al. | 345/173 |
| 2010/0060602 A1 | 3/2010 | Agari et al. | |
| 2010/0123670 A1 | 5/2010 | Philipp | |
| 2010/0214247 A1 | 8/2010 | Tang et al. | |
| 2010/0218100 A1* | 8/2010 | Simon et al. | 715/731 |
| 2010/0252335 A1 | 10/2010 | Orsley | |
| 2011/0018841 A1 | 1/2011 | Hristov | |
| 2011/0102361 A1* | 5/2011 | Philipp | 345/174 |
| 2011/0254790 A1* | 10/2011 | Suzuki et al. | 345/173 |
| 2011/0310037 A1 | 12/2011 | Moran et al. | |
| 2012/0013546 A1 | 1/2012 | Westhues et al. | |
| 2012/0062472 A1 | 3/2012 | Yilmaz | |
| 2012/0062516 A1 | 3/2012 | Chen et al. | |
| 2012/0086669 A1 | 4/2012 | Kim et al. | |
| 2012/0092288 A1 | 4/2012 | Wadia | |
| 2012/0162116 A1 | 6/2012 | Philipp | |
| 2012/0242585 A1* | 9/2012 | Jones et al. | 345/173 |
| 2012/0261242 A1 | 10/2012 | Guard et al. | |
| 2012/0327011 A1 | 12/2012 | Faubert et al. | |
| 2013/0009905 A1 | 1/2013 | Castillo et al. | |
| 2013/0032414 A1* | 2/2013 | Yilmaz et al. | 178/18.06 |
| 2013/0063371 A1 | 3/2013 | Lee et al. | |
| 2013/0082964 A1 | 4/2013 | Agari et al. | |
| 2013/0100054 A1 | 4/2013 | Philipp | |
| 2014/0360856 A1 | 12/2014 | Mizumoto et al. | |

OTHER PUBLICATIONS

Bittner, Ray et al., "VersaPatch: A Low Cost 2.5D Capacitive Touch Sensor", http://research.microsoft.com/pubs/101230/versapatch%20a%20low%20cost%202.5d%20capacitive%20touch%20sensor_ray%20bittner_mike%20sinclair.pdf, Proceedings of the 13th International Conference on Human-Computer Interaction. Part II: Novel Interaction Methods and Techniques, Aug. 2009, 10 pages.

ISA European Patent Office, International Search Report and Written Opinion for Patent Application No. PCT/US2014/010269, Feb. 25, 2014, 11 pages.

O'Connor, Todd, "mTouch™ Projected Capacitive Touch Screen Sensing Theory of Operation", Retrieved at <<http://ww1.microchip.com/downloads/en/DeviceDoc/93064A.pdf>>, Retrieved Date: Dec. 12, 2012, pp. 16.

Keeping, Steven., "Improving Touch Screen Performance by Good Design-", Retrieved at <<http://www.digikey.com/us/en/techzone/sensors/resources/articles/improving-touch-screen-performance.html>>, Retrieved Date: Dec. 12, 2012, pp. 9.

Baharava, et al., "Capacitive Touch Sensing : Signal and Image Processing Algorithms-", Retrieved at <<http://www3.ntu.edu.sg/home/ramakrishna/spie2011captouch.pdf>>, Proc. SPIE Conference on Computational Imaging, Jan. 2011, pp. 12.

ISA European Patent Office, International Search Report & Written Opinion for PCT/US2014/043300, WIPO, Sep. 2, 2014, 11 Pages.

ISA European Patent Office, International Search Report & Written Opinion for PCT/US2014/043301, WIPO, Sep. 1, 2014, 8 Pages.

IPEA European Patent Office, Written Opinion of the International Preliminary Examining Authority Issued in Patent Application No. PCT/US2014/043301, May 11, 2015, WIPO, 6 pages.

IPEA European Patent Office, International Preliminary Report on Patentability Issued in Application No. PCT/ US20141043301, Sep. 2, 2015, WIPO, 7 pages.

* cited by examiner

CAPACITIVE TOUCH SURFACE IN CLOSE PROXIMITY TO DISPLAY

BACKGROUND

Capacitive touch screens measure changes in capacitance in a touch sensor having a matrix of rows and columns of electrodes positioned intermediate a touch surface and a display stack, such as a liquid crystal display (LCD) stack, as a user's digit or a stylus contacts the touch surface. These changes in capacitance are used to determine which row and column correspond to a touch, and further to interpolate a distance and direction to which the detected touch is off-center of the row and column capacitor at which the touch was detected. In this way, a user's touch may be detected and tracked with fine resolution as it moves across the touch surface.

One challenge faced by manufacturers is the development of capacitive touch screens suitable for use in large format devices such as large screen televisions and displays. Small capacitive touch screens less than 30 inches in diagonal typically use a touch sensor having a diamond shaped matrix of a transparent conducting oxide (TCO), such as indium tin oxide (ITO). However, for large capacitive touch sensors, TCO touch sensors applied with thicknesses that are sufficiently transparent to be aesthetically acceptable to users have a resistance that in combination with the capacitances under test and certain other stray capacitances may result in an RC time constant slow enough to limit the achievable excitation frequency of the touch sensor, and thus limit the achievable frame rate for a desired signal to noise ratio. As a result, TCO is generally limited to application to displays with less than a 30 inch diagonal dimension.

In addition, while small capacitive touch screens using TCO touch sensors are relatively inexpensive to produce, large format touch screens have a tremendously high cost of manufacture, which puts them out of reach of most consumers. One of the most costly components to assemble in a large format screen is a glass touch surface, preferred for its ability to provide a high dielectric constant, among other characteristics. However, glass has the disadvantage of being expensive, heavy and rigid. Bonding the rigid glass to a rigid LCD substrate often requires a relatively thick and flexible optically clear adhesive layer to absorb lamination strain from the rigid-to-rigid bond, which could otherwise cause damage.

Another challenge faced by manufacturers is the electric interference between the LCD stack itself and the electrodes in the row and column matrix. As the LCD stack is positioned closer to the electrode matrix, the LCD stack can interfere with the electric fields of the touch sensing capacitors. This interference occurs because conductors within the LCD held at time-varying voltages couple noise current into the electrodes, and because the proximity of electrically conductive material within the LCD affects the shape of the electric field set up by the electrodes, and thus affects the observed change in capacitance in response to a finger touch. Too much interference results in a low signal to noise ratio in the touch sensing circuitry. As a result, touch sensing accuracy is degraded. Digital signal processing approaches have been proposed to improve the signal to noise ratio; however, such approaches add cost, complication, and processing delay to the system.

These challenges are further complicated by their interrelationship. Elimination of costly glass in favor of a thinner plastic touch sheet leads to greater interference by the LCD stack and degraded touch sensing performance.

In view of these challenges, the development of a cost-effective large format capacitive touch screen device has remained elusive.

SUMMARY

To address the above issues, a display device with a capacitive touch screen display having a touch surface in close proximity to a display stack is provided. The display may include a touch sheet with a top surface, a touch sensor having a matrix of capacitors formed of electrodes having metal conductors positioned below the touch sheet and configured to exhibit a change in capacitance of at least one of the capacitors in response to a touch on the top surface by a digit or stylus of a user, and a display stack positioned below the matrix of capacitors and configured to emit light through a top surface of the display stack to travel in a light emitting direction through the matrix of capacitors and the touch sheet. A distance between the top surface of the touch sheet and the top surface of the display stack is between about 225 and 1500 micrometers.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
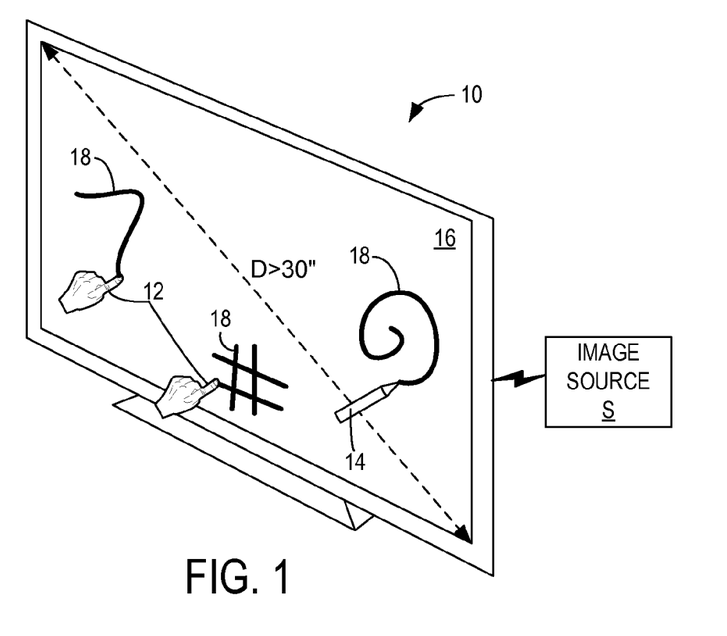
FIG. 1 is a perspective view of a large format multi-touch display device in accordance with one embodiment of the present disclosure.

FIG. 1 shows a large format multi-touch display device 10 according to one embodiment of the present disclosure. Display device 10 typically has a diagonal dimension of greater than 30 inches. In some particularly large format embodiments, this diagonal dimension can be 55 inches or greater. Display device 10 is typically configured to sense multiple touches of a digit 12 or stylus 14 of a user. Display device 10 may be connected to an image source S, such as an external computer or onboard processor. The image source S may be provided with multi-touch input from the display device, process the multi-touch input, and may produce appropriate graphical output 18 for display on the display device 10. Image source S is described in greater detail below in relation to FIG. 6.

Figure 2:
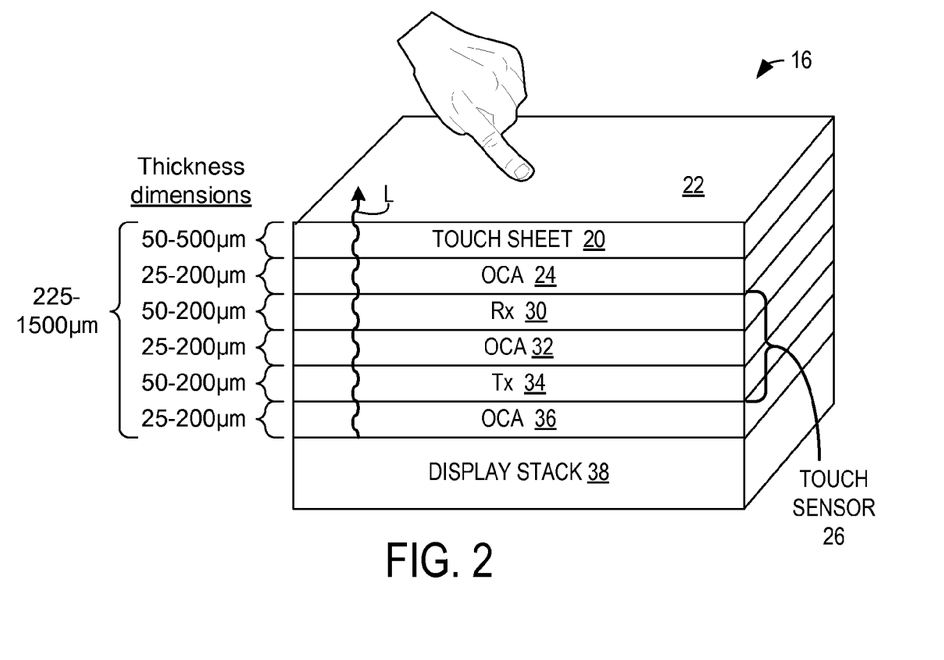
FIG. 2 is a cross-sectional view of an optical stack for a capacitive touch sensitive display of the large format multi-touch display device of FIG. 1.

As shown in FIG. 2, to enable multi-touch sensing functionality, display device 10 is equipped with a capacitive touch-sensitive display 16. FIG. 2 illustrates a schematic view of a partial cross section of an optical stack for the capacitive touch-sensitive display 16. As shown, display 16 includes a plastic, optically clear touch sheet 20 with a top surface 22 for receiving digit or stylus touches, and an optically clear adhesive layer 24 that bonds a bottom surface of the touch sheet 20 to a top surface of a touch sensor 26. Those of ordinary skill in the art will appreciate that optically clear adhesives refer to a class of adhesives that transmit substantially all (e.g., about 99%) of visible light that is incident upon them.

As is discussed in detail with respect to FIG. 3 below, touch sensor 26 is equipped with a matrix of capacitors formed of electrodes positioned a distance below the touch sheet. These electrodes are formed in a receive electrode layer 30 and in a transmit electrode layer 34. Typically, the electrodes include metallic conductors, manufactured, for example, by chemically etching a uniform sheet of metal deposited as a thin film, or by an additive process in which a catalytic ink is applied to a dielectric substrate, where that substrate is subsequently treated in such a way as to plate metal where the ink is present, or by laying metal wire (for example, metal wire of approximately circular cross section with diameter between 3 micrometers and 15 micrometers) into a dielectric adhesive substrate, or by other similar means. Although transparent conducting oxide (TCO) is typically not used in the electrodes, partial use of TCO to form a portion of the electrodes with other portions being formed of metal is not excluded. In one example, the electrodes may be thin metal of substantially constant cross section, and may be sized so as to be optically inconspicuous to a viewer of the display.

The receive electrode layer 30 and transmit electrode layer 34 are bonded together by another optically clear adhesive layer 32. To detect finger touches, the rows are typically successively driven with a time varying voltage, and the columns held at ground. The designation of one axis as the rows and another as the columns is arbitrary, and these axes may intersect at an angle other than 90°. The electrodes are configured to exhibit a change in capacitance of at least one of the capacitors in the matrix in response to a touch on the top surface by a digit or stylus of a user. A detection circuit is configured to detect this change in capacitance as the time varying voltage is applied, and based upon the timing of the detection and the degree of attenuation and/or phase shift in a measured current, the capacitance under test can be estimated and the row and column of the detected touch can be identified. The structure of the electrodes is discussed in more detail below with reference to FIGS. 3 and 4.

Returning to FIG. 2, a light-emitting display stack 38, such as a liquid crystal display (LCD) stack, organic light-emitting diode (OLED) stack, plasma display panel (PDP), or other flat panel display stack, is positioned below the matrix of capacitors. An optically clear adhesive layer 36 joins a bottom surface of the matrix of capacitors to the top surface of the display stack 38. The display stack 38 is configured to emit light L through a top surface of the display stack 38, such that the emitted light travels in a light emitting direction through optically clear adhesive layer 36, the matrix of capacitors resulting from the receive electrode layer 30 and transmit electrode layer 34 in touch sensor 26, optically clear adhesive layer 32, optically clear adhesive layer 24, and touch sheet 20. In this way, the light appears to the user as a displayed image on top surface 22 of the touch sheet 20.

The geometries of the optical stack of display 16 will now be described. The touch sheet 20 is typically between about 50 and 500 micrometers in thickness, and in some embodiments is 115 to 135 micrometers in thickness, and in one exemplary embodiment is 125 micrometers in thickness. These ranges have been found to enable sufficient dielectric material to be positioned between the touch sensor electrodes and the user's digit or stylus to provide desired friction and wear properties, while thin enough to avoid undesirable parallax effects.

Typically, each of optically clear adhesive layers 24, 32, and 36 is between about 25 and 200 micrometers in thickness. This range of thicknesses provides sufficient adhesion, while still preserving the compact size of the optical stack.

The distance in the thickness dimension between the top surface of the touch sheet and the top surface of the display stack 38 is typically between about 225 and 1500 micrometers. In another embodiment, the thickness between the top surface of the touch sheet and the top surface of the display stack 38 is between about 300 and 1125 micrometers. Thicknesses in these ranges provide a compact arrangement of the optical stack and avoid introduction of undesirable parallax effects, while at the same time providing sufficient space for the electrodes in the touch sensor to perform their function, without electrical interference from the display stack 38 on the touch sensing functionality.

Figure 3:
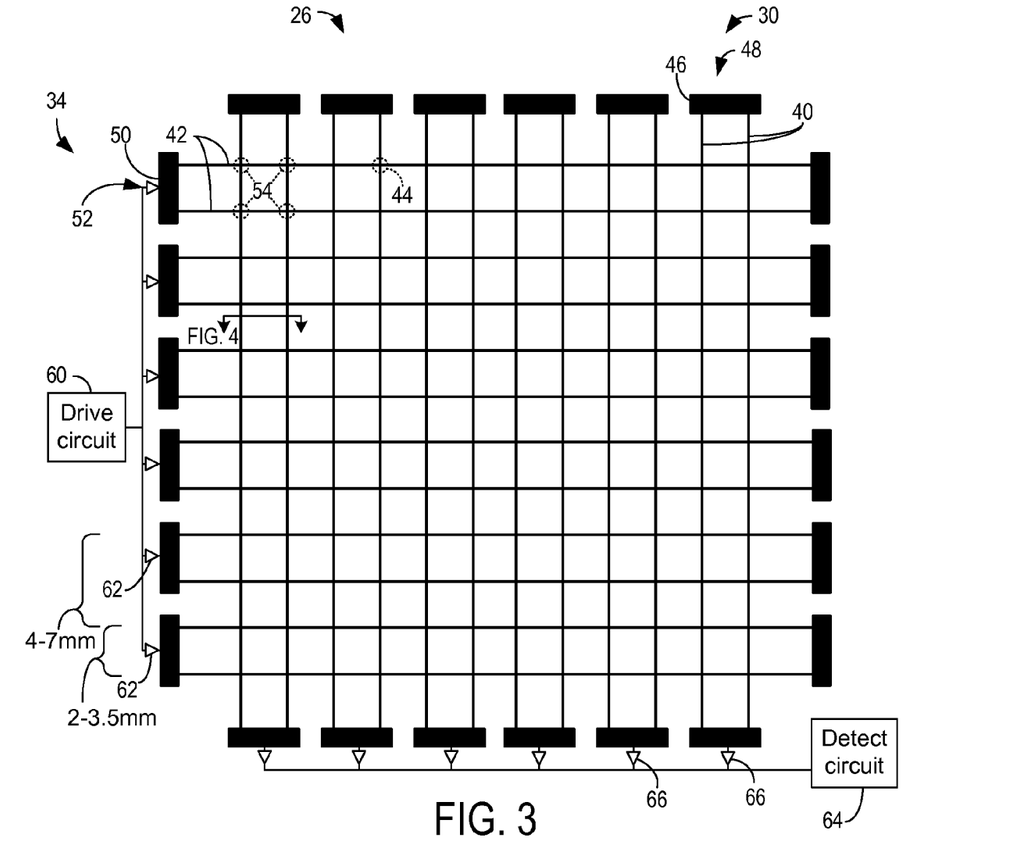
FIG. 3 is a simplified schematic top view of a touch sensor of the capacitive touch sensitive display of FIG. 1.

As shown in FIG. 3, the receive electrode layer 30 includes a plurality of receive electrodes 40 arranged in columns, and the transmit electrode layer 34 includes a plurality of transmit electrodes 42 arranged in rows. As shown in cross section in FIG. 4, the optically clear adhesive layer 32 forms a dielectric layer positioned intermediate the receive electrode layer 30 and transmit electrode layer 34. A respective capacitor 44 is formed at intersecting regions between each receive electrode 40 in the receive electrode layer 30 and each transmit electrode 42 in the transmit electrode layer 34.

The receive electrode layer is typically between about 50 and 200 micrometers in thickness, and the transmit layer is also typically between about 50 and 200 micrometers in thickness, as illustrated in FIG. 2. Like the display device 10, the top sheet 20, the touch sensor 26, the display stack 38, and each of the optically clear adhesive layers 24, 32, and 36 each typically have a diagonal dimension that is 30 inches or greater, and in some embodiments have a diagonal dimension is 55 inches or greater.

The receive electrodes 40 in the columns and the transmit electrodes 42 in the rows in the matrix are spaced at sufficiently fine pitch so as to inhibit electric interference between electrodes in the display stack 38 and electric fields emitted by the capacitors in the matrix above the top sheet. Typically the interference is inhibited to an extent sufficient to bring the ratio in the change of capacitance due to a digit touch for a capacitor to the full capacitance for the capacitor to between 1:10 and 8:10, and in some embodiments to about 3:10. To achieve this, the pitch of the conductors that form the electrodes in both the rows and columns is 3.5 mm or finer, and in some embodiments between 2 and 3.5 mm, and in other embodiments is about 3 mm.

The matrix further includes a plurality of receive tie structures 46, which are conductors that electrically connect a plurality of adjacent receive electrodes 40 into a receive electrode group 48. The matrix also further includes a plurality of transmit tie structures 50, which are conductors that electrically connect a plurality of adjacent transmit electrodes 42 into a transmit electrode group 52. By using receive tie structures 46 and transmit tie structures 50 in this manner, the effective capacitance between an intersecting region 54 of the receive electrode group and the transmit electrode group is increased by approximately a factor of four, as compared to a structure in which the receive electrodes and transmit electrodes are untied and the capacitance of each capacitor 44 is independent. Although two electrodes per tie structure is illustrated in FIG. 3, it will be appreciated that each of the receive tie structures 46 and each of the transmit tie structures 50 may include three or more corresponding receive electrodes or transmit electrodes, which would result in an even higher increase in effective capacitance between intersecting regions 54 of the receive electrode group and transmit electrode group. Further, the number of electrodes per tie structure may vary for the receive electrode layer and the transmit electrode layer, or even within each layer, if desired. As illustrated, the pitch of the transmit electrode groups in the rows and receive electrode groups in the columns is typically finer than 7 mm, and in some embodiments between 4 and 7 mm, and in other embodiments is about 6 mm. Pitches in these ranges provide sufficient sensing resolution for the touch sensor 26. As discussed above, the pitch of the individual conductors that form each electrode within the electrode groups (e.g., the metallic conductors depicted by the horizontal and vertical lines in FIG. 3) is 3.5 mm or finer, and in some embodiments between 2 and 3.5 mm as shown in FIG. 3, and in other embodiments about 3 mm. Pitches in these ranges provide sufficient shielding from potential electric interference caused by the display stack 38. While the pitch of the receive electrodes and transmit electrodes is illustrated as the same in FIG. 3, it will be appreciated that in some embodiments, a different pitch in the ranges given above may be used for each.

A drive circuit 60 is provided to successively drive time varying voltages to each transmit electrode group via transmitters 62, and a detect circuit 64 is provided to sense changes in current in via receivers 66. The changes in capacitance of each capacitor, or each capacitor group, corresponding to a finger or stylus touch are deduced from changes in current detected by the detect circuit. Based upon the timing of those changes and the phase shift and/or attenuation in the received current signal, the row and column of the finger touch is determined.

Figure 4:
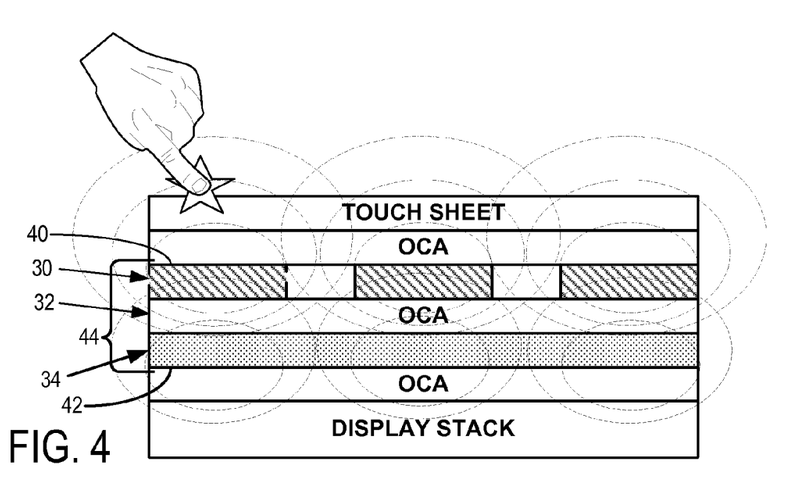
FIG. 4 is a partial cross-sectional view of the touch sensor of the capacitive touch sensitive display of FIG. 1, taken along the lines 4-4 of FIG. 3.

As shown in FIG. 4, the above described configuration of the electrodes in the touch sensor 26 effectively shields the electric field of each capacitor 44, represented schematically in dot dashed lines, in a region of the touch surface from undesirable electric interference (represented in dashed lines) that would otherwise be caused by the display stack 38. As a result, even with display 16 constructed of a stack having the thin dimensions described above, the touch of a stylus or digit of the user (illustrated by a star) is able to properly cause a change in capacitance for the capacitor 44 relative to the full capacitance of the capacitor 44 that is in the ranges described above, to enable the display device to properly sense a touch on the display surface.

Further, by using a plastic touch sheet instead of a rigid glass touch surface, the problems associated with laminar strain due to rigid to rigid bonding of the glass with the display stack through intermediate layers are avoided, and there is no need to provide a thick strain absorbing layer of optically clear adhesive to absorb the strain. Rather, a thin layer of the dimensions described above may be used for optically clear adhesive layer 36. Further, the above described configuration is lower in cost to manufacture than conventional large format capacitive touch sensitive displays that use glass as a touch surface.

Figure 5:
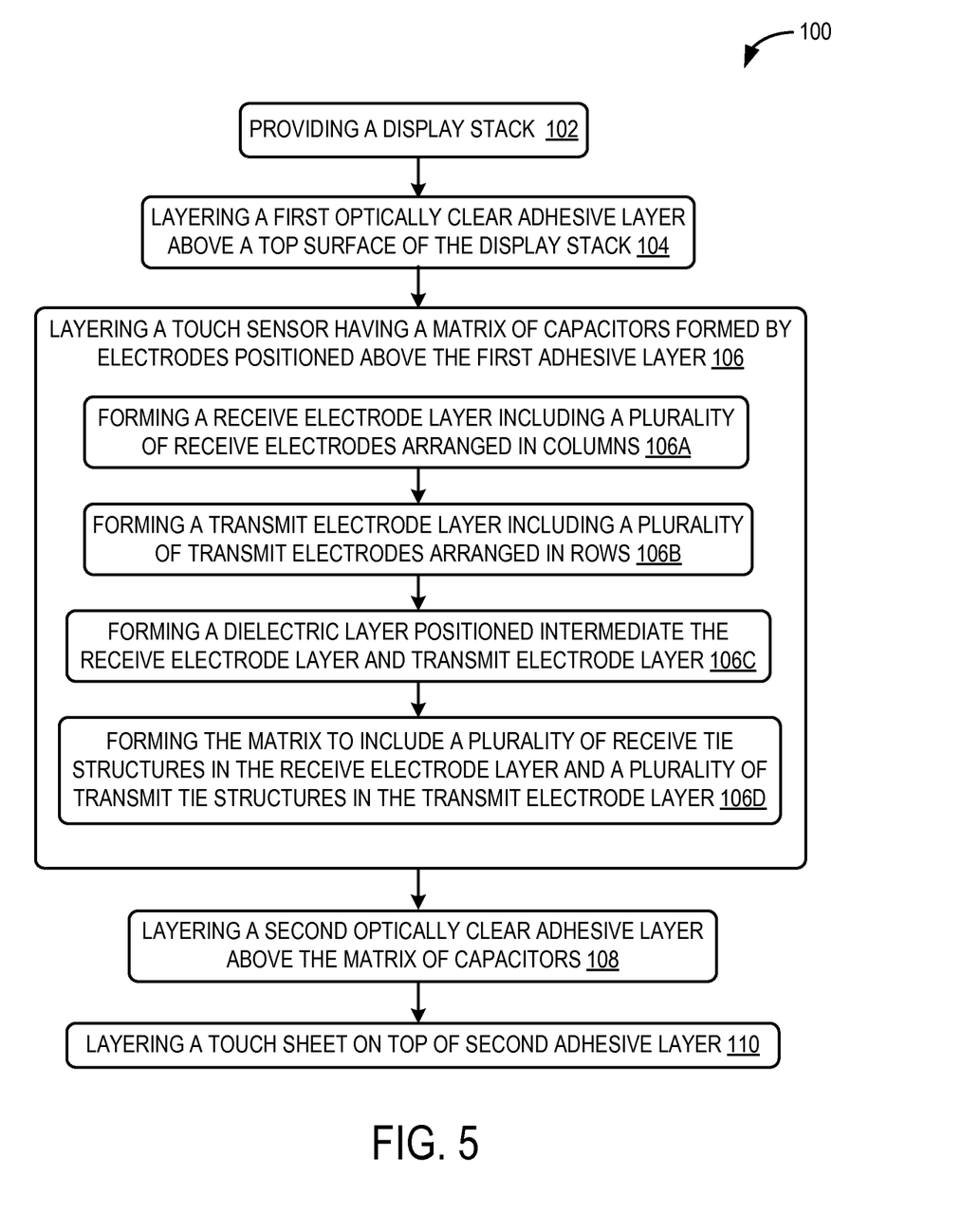
FIG. 5 is a flowchart illustrating a method of manufacturing a capacitive touch sensitive display device in accordance with one embodiment of the present disclosure.

Turning now to FIG. 5, a method 100 of manufacturing a capacitive touch sensitive display device according to one embodiment of the present disclosure will be described. Method 100 includes, at 102, providing a display stack configured to emit light through a top surface of the display stack. As discussed above, an LCD stack, OLED stack, PDP stack, or other flat panel display stack may be used as the display stack in method 100. At 104, the method includes layering a first optically clear adhesive layer on a top surface of the display stack, and at 106, layering a touch sensor having a matrix of capacitors formed by electrodes including metal conductors positioned above the first adhesive layer. At 108, the method includes layering a second optically clear adhesive layer above the matrix of capacitors, and at 110 layering a touch sheet above the second adhesive layer. The matrix of capacitors is configured to exhibit a change in capacitance of at least one of the capacitors in response to a touch on the top surface of the touch sheet of by a digit or stylus of a user.

The dimensions of the layers formed in method 100 are as follows. Typically, a distance between a top surface of the touch sheet and the top surface of the display stack is between about 225 and 1500 micrometers, and may be between 300 and 1125 micrometers. The touch sheet is typically between about 50 and 500 micrometers in thickness. Each of the first and second optically clear adhesive layers may be between about 25 and 200 micrometers in thickness. The advantages of these thickness dimensions are discussed in detail above. The top sheet, the touch sensor, and the display stack, each have diagonal dimension that is 30 inches or greater, in some embodiments 55 inches or greater.

The touch sensor that is layered at step 106 may be formed by, at 106A, forming a receive electrode layer including a plurality of receive electrodes arranged in columns, at 106B, forming a transmit electrode layer including a plurality of transmit electrodes arranged in rows, and at 106D, forming a dielectric layer positioned intermediate the receive layer and transmit layer. In this manner, a respective capacitor is formed at intersecting regions between each electrode in the receive layer and each electrode in the transmit layer. Typically, each of the receive electrode layer and transmit electrode layer is between about 50 and 200 micrometers in thickness, and the electrodes include metallic conductors. The metallic conductors may have constant cross-section along their length, or may vary in cross section.

The receive electrodes in the columns and the transmit electrodes in the rows in the matrix of the touch sensor are spaced at sufficiently fine pitch so as to inhibit electric interference between electrodes in the display stack and electric fields emitted by the capacitors in the matrix above the top sheet. The interference is inhibited to an extent sufficient to bring the ratio in the change of capacitance due to a digit touch for a capacitor to the full capacitance for the capacitor to between 1:10 and 8:10, and in one embodiment about 3:10. With these ratios clear reading of the signal by a detect circuit may be performed, without costly and time consuming digital signal processing to remove noise. To achieve this, the pitch for the conductors that form the electrodes may be set to 3.5 mm or finer, and between 2 and 3.5 mm in some embodiments, and about 3 mm in other embodiments, and the pitch for the electrode groups may be set to be finer than 7 mm, and from 4 to 7 millimeters in some embodiments, and in one embodiment 6 millimeters. These pitch ranges offer sufficient shielding of the interference and sufficient resolution for touch sensing, with pitches finer than 4 millimeters being possible but offering little additional performance gain in terms of the resolution and accuracy of finger touch sensing. Pitches greater than 7 millimeters tend to result in reduced finger touch positional accuracy for the display device.

At 106D, method 100 may further include forming the matrix to include a plurality of receive tie structures electrically connecting a plurality of adjacent receive electrodes into a receive electrode group, and also to further include a plurality of transmit tie structures electrically connecting a plurality of adjacent transmit electrodes into a transmit electrode group, to thereby increase the effective capacitance between the receive intersecting regions of the electrode group and the transmit electrode group by at least approximately a factor of four, as compared to a structure in which the receive electrodes and transmit electrodes are untied.

With the methods described above, a large format capacitive touch sensitive display device may be manufactured that shields the touch sensor from electric interference from the display stack to enable accurate touch sensing, while at the same time offering cost advantages as compared to prior large format capacitive touch sensitive display devices.

Figure 6:
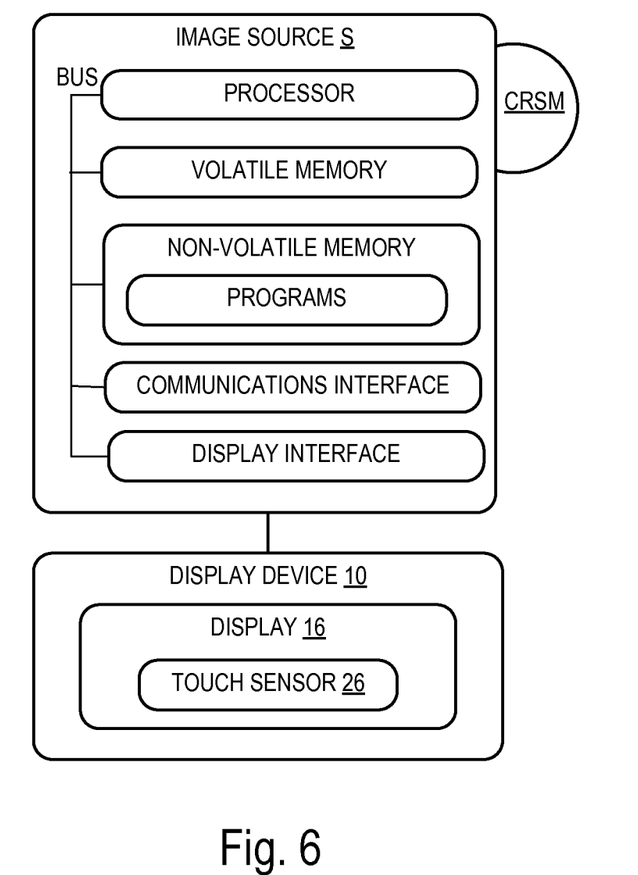
FIG. 6 is a schematic view of an image source for the display device of FIG. 1.

FIG. 6 illustrates an exemplary image source S according to one embodiment of the present invention. As discussed above, image source S may be an external computing device, such as a server, laptop computing device, set top box, game console, desktop computer, tablet computing device, mobile telephone, or other suitable computing device. Alternatively, image source S may be integrated within display device 10.

Image source S includes a processor, volatile memory, and non-volatile memory, such as mass storage, which is configured to store software programs in a non-volatile manner. The stored programs are executed by the processor using portions of volatile memory. Input for the programs may be received via a variety of user input devices, including touch sensor 26 integrated with display 16 of display device 10. The input may be processed by the programs, and suitable graphical output may be sent to display device 10 via a display interface for display to a user.

The processor, volatile memory, and non-volatile memory may be formed of separate components, or may be integrated into a system on a chip, for example. Further the processor may be a central processing unit, a multi-core processor, an ASIC, system-on-chip, or other type of processor. In some embodiments, aspects of the processor, volatile memory and non-volatile memory may be integrated into devices such as field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

A communications interface may also be provided to communicate with other computing devices, such as servers, across local and wide area network connections, such as the Internet.

The non-volatile memory may include removable media and/or built-in devices. For example, non-volatile memory may include optical memory devices (e.g., CD, DVD, HD-DVD, Blu-Ray Disc, etc.), semiconductor memory devices (e.g., FLASH, EPROM, EEPROM, etc.) and/or magnetic memory devices (e.g., hard disk drive, floppy disk drive, tape drive, MRAM, etc.), among others.

Removable computer readable storage media (CRSM) may be provided, which may be used to store data and/or instructions executable to implement the methods and processes described herein. Removable computer-readable storage media may take the form of CDs, DVDs, HD-DVDs, Blu-Ray Discs, EEPROMs, and/or floppy disks, among others.

Although the non-volatile memory and CRSM are physical devices configured to hold instructions for a duration of time, typically even upon power down of the image source, in some embodiments, aspects of the instructions described herein may be propagated by a computer readable communication medium, such as the illustrated communications bus, in a transitory fashion by a pure signal (e.g., an electromagnetic signal, an optical signal, etc.) that is not held by a physical device for at least a finite duration.

The term "program" may be used to describe software firmware, etc. of the system that is implemented to perform one or more particular functions. In some cases, such a program may be instantiated via the processor executing instructions held by non-volatile memory, using portions of volatile memory. It is to be understood that different programs may be instantiated from the same application, service, code block, object, library, routine, API, function, etc. Likewise, the same program may be instantiated by different applications, services, code blocks, objects, routines, APIs, functions, etc. The term "program" is meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense, because numerous variations are possible. The embodiments described above and the embodiments illustrated in the drawings serve as examples of the variety of different devices. The subject matter of the present disclosure includes all novel and nonobvious combinations and subcombinations of the various configurations, features, functions, and/or properties disclosed herein, as well as any and all equivalents thereof.

The invention claimed is:

1. A capacitive touch sensitive display device, comprising:
    a touch sheet with a top surface;
    a touch sensor having a matrix of capacitors formed of electrodes including metallic conductors positioned below the touch sheet and configured to exhibit a change in capacitance of at least one of the capacitors in response to a touch on the top surface by a digit or stylus of a user, the touch sensor comprising a receive electrode layer including a plurality of receive electrodes arranged in columns, a transmit electrode layer including a plurality of transmit electrodes arranged in rows, and a dielectric layer positioned intermediate the receive electrode layer and the transmit electrode layer; and
    a display stack positioned below the matrix of capacitors and configured to emit light through a top surface of the display stack, to travel in a light emitting direction through the touch sensor and the touch sheet;
    wherein a distance between the top surface of the touch sheet and the top surface of the display stack is between about 300 and 1125 micrometers, and
    wherein the receive electrode layer and the transmit electrode layer are each greater than 50 and less than or equal to 200 micrometers in thickness.

2. The capacitive touch sensitive display device of claim 1, wherein the touch sheet is between about 50 and 500 micrometers in thickness.

3. The capacitive touch sensitive display device of claim 1, further comprising:
    a first optically clear adhesive layer joining a bottom surface of the touch sensor to the top surface of the display stack;
    wherein the first optically clear adhesive layer is between about 25 and 200 micrometers in thickness.

4. The capacitive touch sensitive display device of claim 3, further comprising:
    a second optically clear adhesive layer joining a bottom surface of the touch sheet to a top surface of the touch sensor; and
    wherein the second optically clear adhesive layer is between about 25 and 200 micrometers in thickness.

5. The capacitive touch sensitive display device of claim 1, wherein a respective capacitor is formed at intersecting regions between each electrode in the receive electrode layer and each electrode in the transmit electrode layer.

6. The capacitive touch sensitive display device of claim 5, wherein the metallic conductors of the receive electrodes in the columns and the metallic conductors of the transmit electrodes in the rows in the matrix are spaced at sufficiently fine pitch so as to inhibit electric interference between electrodes in the display stack and electric fields emitted by the capacitors in the matrix above the top sheet, the interference being inhibited to an extent sufficient to bring a ratio in the change of capacitance due to a digit or stylus touch for a capacitor to a full capacitance for the capacitor to between 1:10 and 8:10.

7. The capacitive touch sensitive display device of claim 6, wherein the pitch of the metallic conductors of the receive electrodes and of the metallic conductors of the transmit electrodes is between 2 and 3.5 mm.

8. The capacitive touch sensitive display device of claim 5, wherein the touch sensor further includes a plurality of receive tie structures each electrically connecting a plurality of adjacent receive electrodes into a corresponding receive electrode group, and also further includes a plurality of transmit tie structures each electrically connecting a plurality of adjacent transmit electrodes into a corresponding transmit electrode group, to thereby increase an effective capacitance between an intersecting region of each receive electrode group and each transmit electrode group by at least approximately a factor of four, as compared to a structure in which the receive electrodes and transmit electrodes are untied.

9. The capacitive touch sensitive display device of claim 8, wherein the receive electrode groups and the transmit electrode groups are arranged at a pitch of between 4 and 7 mm.

10. The capacitive touch sensitive display device of claim 1, wherein the top sheet, the touch sensor, and the display stack each have a diagonal dimension that is 30 inches or greater.

11. A method of manufacturing a capacitive touch sensitive display device, comprising:
providing a display stack configured to emit light through a top surface of the display stack;
layering a first optically clear adhesive layer on a top surface of the display stack;
layering a touch sensor having a matrix of capacitors formed by electrodes including metallic conductors positioned above the first adhesive layer;
forming the matrix of capacitors by:
forming a receive electrode layer including a plurality of receive electrodes arranged in columns;
forming a transmit electrode layer including a plurality of transmit electrodes arranged in rows; and
forming a dielectric layer positioned intermediate the receive electrode layer and transmit electrode layer;
layering a second optically clear adhesive layer above the matrix of capacitors;
layering a touch sheet above the second adhesive layer;
wherein a distance between a top surface of the touch sheet and the top surface of the display stack is between about 300 and 1125 micrometers; and
wherein the matrix of capacitors is configured to exhibit a change in capacitance of at least one of the capacitors in response to a touch on the top surface of the touch sheet of by a digit or stylus of a user,
wherein a respective capacitor is formed at intersecting regions between each electrode in the receive electrode layer and each electrode in the transmit electrode layer, and
wherein each of the receive electrode layer and transmit electrode layer is greater than 50 and less than or equal to 200 micrometers in thickness.

12. The method of manufacturing a capacitive touch sensitive display device of claim 11, wherein the touch sheet is between about 50 and 500 micrometers in thickness.

13. The method of manufacturing a capacitive touch sensitive display device of claim 11, wherein each of the first and second optically clear adhesive layers is between about 25 and 200 micrometers in thickness.

14. The method of manufacturing a capacitive touch sensitive display device of claim 11, wherein the metallic conductors of the receive electrodes in the columns and the metallic conductors of the transmit electrodes in the rows in the matrix are spaced at sufficiently fine pitch so as to inhibit electric interference between electrodes in the display stack and electric fields emitted by the capacitors in the matrix above the top sheet, the interference being inhibited to an extent sufficient to bring a ratio in the change of capacitance due to a digit or stylus touch for a capacitor to a full capacitance for the capacitor to between 1:10 and 8:10, the pitch being 3.5 mm or finer.

15. The method of manufacturing a capacitive touch sensitive display device of claim 11, further comprising, forming the matrix to further include a plurality of receive tie structures electrically connecting a plurality of adjacent receive electrodes into a receive electrode group, and also to further include a plurality of transmit tie structures electrically connecting a plurality of adjacent transmit electrodes into a transmit electrode group, to thereby increase an effective capacitance between an intersecting region of the receive electrode group and the transmit electrode group by at least approximately a factor of four, as compared to a structure in which the receive electrodes and transmit electrodes are untied.

16. The method of manufacturing a capacitive touch sensitive display device of claim 11, wherein the top sheet, the matrix of capacitors, and the display stack each have a diagonal dimension that exceeds 30 inches.

17. A capacitive touch sensitive display device, comprising:
a touch sheet with a top surface, the touch sheet being about 50 and 500 micrometers in thickness;
a touch sensor having a matrix of capacitors formed by electrodes including metallic conductors positioned below the touch sheet and configured to exhibit a change in capacitance of at least one of the capacitors in response to a touch on the top surface by a digit or stylus of a user, the touch sensor including a receive electrode layer including a plurality of receive electrodes arranged in rows, a transmit electrode layer including a plurality of transmit electrodes arranged in columns, and a dielectric layer positioned intermediate the receive electrode layer and transmit electrode layer, wherein respective capacitors are formed at intersecting regions between each electrode in the receive electrode layer and each electrode in the transmit electrode layer;
an LCD display stack positioned below the matrix of capacitors and configured to emit light through a top surface of the LCD display stack, to travel in a light emitting direction through the matrix of capacitors and the touch sheet; and
a first optically clear adhesive layer joining a bottom surface of the touch sensor to the top surface of the LCD display stack, the first optically clear adhesive layer being between about 25 and 200 micrometers in thickness;

wherein a distance between the top surface of the touch sheet and the top surface of the LCD display stack is between about 300 and 1125 micrometers;

wherein the metallic conductors of the receive electrodes in the columns and the metallic conductors of the transmit electrodes in the rows in the matrix are spaced at a pitch of between 2 and 3.5 mm, and wherein the receive electrode layer and the transmit electrode layer are each greater than 50 and less than or equal to 200 micrometers in thickness.

* * * * *